US011867080B2

(12) United States Patent
Schlemmer et al.

(10) Patent No.: US 11,867,080 B2
(45) Date of Patent: Jan. 9, 2024

(54) INTEGRALLY BLADED TURBOMACHINE ROTOR

(71) Applicant: MTU Aero Engines AG, Munich (DE)

(72) Inventors: Markus Schlemmer, Mainburg/Sandelzhausen (DE); Hans-Peter Hackenberg, Olching (DE); Claudia Stoehr, Dachau (DE); Andreas Hartung, Munich (DE); Michael Junge, Munich (DE)

(73) Assignee: MTU Aero Engines AG, Munich (DE)

( * ) Notice: Subject to any disclaimer, the term of this patent is extended or adjusted under 35 U.S.C. 154(b) by 47 days.

(21) Appl. No.: 17/627,782

(22) PCT Filed: Jul. 2, 2020

(86) PCT No.: PCT/DE2020/000147

§ 371 (c)(1),
(2) Date: Jan. 17, 2022

(87) PCT Pub. No.: WO2021/013279

PCT Pub. Date: Jan. 28, 2021

(65) Prior Publication Data

US 2022/0325628 A1 Oct. 13, 2022

(30) Foreign Application Priority Data

Jul. 19, 2019 (DE) ......................... 102019210753.2

(51) Int. Cl.
*F01D 5/10* (2006.01)

(52) U.S. Cl.
CPC ............ *F01D 5/10* (2013.01); *F05D 2220/32* (2013.01); *F05D 2260/96* (2013.01)

(58) Field of Classification Search
CPC ..... F01D 5/10; F05D 2220/32; F05D 2260/96
See application file for complete search history.

(56) References Cited

U.S. PATENT DOCUMENTS 1,856,786 A * 5/1932 Rice ......................... F01D 5/10
416/500
6,554,112 B2 4/2003 Kato et al.
(Continued)

FOREIGN PATENT DOCUMENTS

DE 10143778 A1 3/2002
DE 102009011963 A1 9/2010
(Continued)

OTHER PUBLICATIONS

See International Search Report of PCT/DE2020/000147.

*Primary Examiner* — David E Sosnowski
*Assistant Examiner* — Theodore C Ribadeneyra
(74) *Attorney, Agent, or Firm* — Davidson, Davidson & Kappel, LLC

(57) ABSTRACT

An integrally bladed rotor for a turbomachine, in particular a compressor or turbine stage of a gas turbine, to which at least one separately formed impulse element housing (40; 40') is fastened by at least one fastening element (30; 30') which engages for this purpose into an opening (41) of the impulse element housing and into an opening (11) of the rotor, the impulse element housing having at least one cavity (44) in which at least one impulse element (5) is accommodated with play.

20 Claims, 2 Drawing Sheets

(56) References Cited

U.S. PATENT DOCUMENTS

| | | | | |
|---|---|---|---|---|
| 8,157,507 | B1 * | 4/2012 | Coffin | F01D 5/26 415/119 |
| 9,371,733 | B2 | 6/2016 | Hartung | |
| 10,526,901 | B2 | 1/2020 | Schlemmer et al. | |
| 10,689,983 | B2 | 6/2020 | Schlemmer et al. | |
| 11,215,062 | B2 * | 1/2022 | Hartung | F01D 5/22 |
| 2013/0280083 | A1 * | 10/2013 | Hartung | F01D 5/16 416/223 R |
| 2016/0010462 | A1 * | 1/2016 | Stiehler | B23P 15/04 29/889.7 |
| 2016/0138401 | A1 * | 5/2016 | Hartung | F04D 29/083 416/220 R |
| 2016/0146041 | A1 * | 5/2016 | Hartung | F01D 25/06 416/190 |
| 2016/0298460 | A1 * | 10/2016 | Bryant | F01D 5/10 |
| 2017/0266745 | A1 * | 9/2017 | Richter | B23K 1/18 |
| 2017/0292387 | A1 | 10/2017 | Schlemmer et al. | |
| 2017/0321557 | A1 * | 11/2017 | Roesele | F04D 29/668 |
| 2018/0119552 | A1 * | 5/2018 | Schlemmer | F01D 5/10 |
| 2018/0230818 | A1 * | 8/2018 | Chakrabarti | F01D 5/10 |

FOREIGN PATENT DOCUMENTS

| | | | |
|---|---|---|---|
| DE | 102016204281 | A1 | 9/2017 |
| EP | 3093435 | A1 | 11/2016 |
| EP | 3231998 | A1 | 10/2017 |
| EP | 3315718 | A1 | 5/2018 |
| WO | WO 2012/095067 | A1 | 7/2012 |

* cited by examiner

INTEGRALLY BLADED TURBOMACHINE ROTOR

The present invention relates to an integrally bladed rotor for a turbomachine, in particular a compressor or turbine stage of a gas turbine, a turbomachine, in particular a gas turbine, having the rotor, as well as a method for reducing vibrations of the rotor.

BACKGROUND

Integrally bladed turbomachine rotors (IBR) or blade integrated disks (BLISK) have rotor blades which are formed integrally with a main body, in one embodiment with a (rotor) disk, and which, in an embodiment, are formed in one piece with the main body, in particular by primary shaping, or connected thereto by material-to-material bonding, preferably by welding, brazing and/or adhesive bonding.

During operation, such rotors, in particular their blades, may be excited into vibrations, which may in particular impair the performance.

A concept for reducing vibrations by impact contacts between impulse elements and cavities accommodating them is known in particular from WO 2012/095067 A1, to which reference is made for the sake of completeness, and the contents of which are incorporated into the present disclosure in their entirety.

SUMMARY OF THE INVENTION

It is an object of an embodiment of the present invention to improve an integrally bladed turbomachine rotor, in particular the performance and/or manufacture thereof.

The present invention provides an integrally bladed rotor for a turbomachine, in particular a compressor or turbine stage of a gas turbine, to which at least one separately formed impulse element housing (40; 40') is fastened by at least one fastening element (30; 30') which engages for this purpose into an opening (41) of the impulse element housing and into an opening (11) of the rotor, the impulse element housing having at least one cavity (44) in which at least one impulse element (5) is accommodated with play.

The present invention also provides a method for reducing vibrations of an integrally bladed rotor as described above, wherein at least one separately formed impulse element housing (40; 40') is fastened to the rotor by at least one fastening element (30; 30') which, for this purpose, is at least partially inserted into an opening (41) of the impulse element housing and into an opening (11) of the rotor.

In accordance with an embodiment of the present invention, one or more separately formed impulse element housings is/are fastened to a (at least one) rotor for a, in particular of a, turbomachine by at least one (respective) fastening element which engages for this purpose into an opening of the (respective) impulse element housing (“impulse element housing opening”) and into an opening of the rotor (“rotor opening”) which is aligned with this impulse element housing opening.

In an embodiment, this makes it possible to achieve a particularly effective reduction of vibrations.

In an embodiment, the, or one or more of the, impulse element housing opening(s) and/or the rotor opening(s) extend in an axial direction, and/or the fastening element(s) is/are inserted thereinto in an axial direction.

In an embodiment, this makes it possible to achieve a particularly effective reduction of vibrations.

In an embodiment, the, or one or more of the—in one embodiment box-like—impulse element housing(s) is/are (each) fastened by exactly or only one fastening element engaging into an impulse element housing opening and into a rotor opening.

In an embodiment, the, or one or more of the—in one embodiment ring-like—impulse element housing(s) is/are (each) fastened by a plurality of fastening elements equidistantly distributed around the circumference and each engaging into an impulse element housing opening and into a rotor opening.

In a respective embodiment, this makes it possible to achieve a particularly effective reduction of vibrations.

In accordance with an embodiment of the present invention, the rotor is an integrally bladed rotor. Due to their weight and/or their strength, such rotors are particularly suitable for gas turbines, in particular aircraft engine gas turbines, it being possible for vibrations of the integral blades of such rotors to be reduced in a particularly advantageous manner by impact contacts between impulse elements and cavities accommodating them in separately formed impulse element housings.

In an embodiment, the rotor is disposed in a turbine stage or, particularly preferably, in a compressor stage of a gas turbine, in particular aircraft engine gas turbines, or is intended, in particular adapted, or used for this purpose. The present invention can be used especially advantageously in connection with such rotors.

In accordance with an embodiment of the present invention, the, or one or more of the, impulse element housing(s), has/(each) have one or more cavities in (each of) which at least one—in one embodiment only or exactly one—impulse element is accommodated with play, in particular for impacting contact between the impulse element and the cavity.

In an embodiment, a particularly effective reduction of vibrations may be achieved in particular by using a plurality of impulse elements which are separately accommodated in cavities in a common impulse element housing, and thus are separated from one another by walls of the impulse element housing.

In an embodiment, the, or one or more of the, impulse element housing(s), is/are (each) disposed on an outer axial end face of the rotor.

In an embodiment, this makes it possible on the one hand to facilitate assembly and to effectively use a space between rotor disks.

In an embodiment, the, or one or more of the, impulse element housing(s), is/are (each) disposed on an inner axial end face of the rotor.

In an embodiment, this makes it possible to advantageously use space available below the rotor blades.

In an embodiment, the, or one or more of the, impulse element housing(s), is/are (each) disposed radially under an, or within or below an inner shroud of the rotor.

In an embodiment, this makes it possible to advantageously use space available below the rotor blades and/or to improve the reduction of vibrations.

As is customary in the art, in particular, the term “axial” as used herein refers to a direction parallel to a (main) machine axis or axis of rotation of the turbomachine or of the rotor, the term “circumferential direction” refers to a direction of rotation about this axis, and the term “radial” refers to a direction that is perpendicular to the axial and circumferential directions, in particular away from the axis.

In an embodiment, the, or one or more, cavity/cavities of the, or of one or more of the, impulse element housing(s) is/are (each) spaced in the circumferential direction from a leading edge or a trailing edge of a (circumferentially) nearest blade of the rotor by no more than 25%, in particular no more than 15%, in one embodiment no more than 10% of a blade pitch. In an embodiment, the blade pitch is a distance between two adjacent leading or trailing edges in the circumferential direction, as is customary in the art.

In an embodiment, this arrangement of cavities as directly as possible under the leading or trailing edge of one or more rotor blades makes it possible to achieve a particularly effective reduction of vibrations.

In an embodiment, the, or one or more of the, impulse element housing(s), is/are (each) frictionally fastened to the rotor. In particular, in an embodiment, the (respective) fastening element includes for this purpose at least one—in one embodiment exactly or only one—screw bolt or threaded bolt or rivet, in particular may be such a screw bolt or threaded bolt or rivet.

In an embodiment, this makes it possible to achieve a particularly effective reduction of vibrations.

In an embodiment, the rotor opening of the, or of one or more of the, impulse element housing(s) has/(each) have a periphery in the form of a closed line or curve or a loop, which is referred to herein as closed periphery.

In an embodiment, this makes it possible to achieve a larger area engagement of the fastening element, and thus a particularly effective reduction of vibrations.

In an embodiment, the rotor opening of the, or of one or more of the, impulse element housing(s) has/(each) have a radially inner (inwardly) open slot, in particular in such a way that the fastening element can be inserted (from) radially (inside).

In an embodiment, this makes it possible to improve the installation and removal of the fastening element.

In an embodiment, the rotor opening(s) for fastening the, or one or more of the, impulse element housing(s) is/are (each) disposed in an—in one embodiment integrally formed—annular flange of the rotor. In an embodiment, this makes it possible to achieve a particularly effective reduction of vibrations.

In a refinement, the rotor opening(s) for fastening the, or one or more of the, impulse element housing(s) is/are (each) disposed in a radially enlarged portion of the annular flange. In an embodiment, this makes it possible to achieve a larger area engagement of the fastening element in combination with a low(er) weight, and thus a particularly effective reduction of vibrations.

In an embodiment, the (impulse element housing) opening of the, or of one or more of the, impulse element housing(s) is/are (each) formed as a through-opening, in particular open at both axial ends. In a refinement, the (respective) fastening element then extends through this impulse element housing through-opening. Additionally or alternatively, the, or one or more of the, fastening element(s) extend(s) through a through-opening of the rotor, which is in particular open at both axial ends. In an embodiment, this makes it possible to achieve a particularly effective reduction of vibrations.

In an alternative embodiment, the, or one or more of the, rotor or impulse element housing opening(s) is/are (each) formed like a blind hole and in particular has/have one open axial end and one closed axial end and, in a refinement, the fastening element engaging therein is screwed thereinto.

In an embodiment, the, or one or more of the, fastening element(s) has/each have an annular flange, in particular a head, which is supported directly or indirectly on the rotor, in particular bears against the rotor, or is intended, in particular adapted, and/or used for this purpose, and/or an annular flange, in particular a head, which is supported directly or indirectly on the (respective) impulse element housing, in particular bears against the (respective) impulse element housing, or is intended, in particular adapted, and/or used for this purpose. Additionally or alternatively, in one embodiment, the, or one or more of the, fastening element(s) is/are (each) connected, in particular threadedly connected, to a sleeve, in particular a threaded nut, located opposite such an annular flange. In an embodiment, this makes it possible to achieve a larger area engagement of the fastening element, and thus a particularly effective reduction of vibrations.

In an embodiment, the, or one or more of the, impulse element housing(s), has/(each) have on either circumferential side of its/their impulse element housing opening a cavity or a plurality of—in one embodiment radially offset—cavities, in each of which at least one impulse element is accommodated with play. In an embodiment, the, or one or more of the, impulse element housing(s), has/(each) have two or more radially offset cavities, respectively, which, in a refinement, are offset from one another in the circumferential direction by no more than twice their (maximum) extent in the circumferential direction and/or in each of which at least one impulse element is accommodated with play. In an embodiment, this makes it possible to achieve a particularly effective reduction of vibrations.

In an embodiment, the, or one or more of the, impulse element housing(s), has/(each) have at least two parts which together bound, in particular define, the, or one or more, cavity/cavities of this impulse element housing, and which are connected together, in one embodiment by the fastening element and/or by a material-to-material bond.

In an embodiment, due to the multi-part housings, the cavities can be filled (more) easily. In an embodiment, due to the material-to-material bond, the cavities can be sealed reliably and/or airtight, and the impulse elements accommodated therein can thus be advantageously protected from environmental influences, in particular oxidation. If in an embodiment, the fastening element extends through (through-openings in) both parts of an impulse element housing (which may together form the impulse element housing opening) and thus (also) connects the two parts together, possibly in addition to a material-to-material bond, then, in an embodiment, this enables safety to be enhanced.

In a refinement, the two, or two of the, parts of the, or of one or more of the, impulse element housing(s) are (respectively) connected together by a material-to-material bond by means of a (first, in particular inner) seam which, in one embodiment, surrounds or encircles the (respective) impulse element housing opening and, in a refinement, is arranged along a periphery of the (respective) impulse element housing opening, and/or by means of a (second, in particular outer) seam which in particular surrounds or encircles this (first) seam and, in one embodiment, is concentric thereto, and which, in one embodiment, surrounds or encircles the (respective) impulse element housing opening and, in a refinement, is arranged along an outer periphery of at least one of these parts. In an embodiment, this makes it possible to improve the support of the fastening element.

In an embodiment, the, or one or more of the, impulse element housing(s), is/are (each) configured in a box-like manner. In an embodiment, this advantageously allows it to be placed locally at particularly suitable locations of the rotor.

In an embodiment, the, or one or more of the, impulse element housing(s), is/are (each) configured in a ring-like manner, in particular to surround an axis (of rotation) of the rotor or of the turbomachine in a ring-like manner. In an embodiment, the mounting on the rotor can thereby be improved.

BRIEF DESCRIPTION OF THE DRAWINGS

Further advantageous refinements of the present invention will become apparent from the dependent claims and the following description of preferred embodiments. To this end, the drawing shows, partly in schematic form, in:

DETAILED DESCRIPTION

Figure 1:
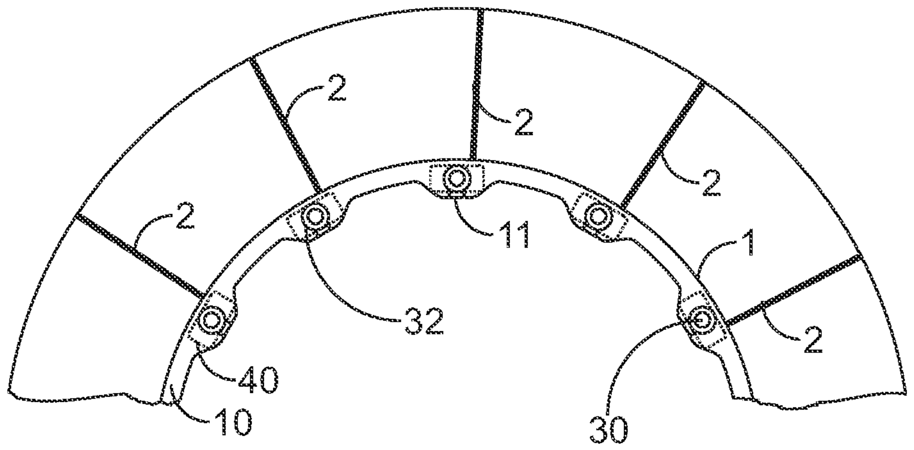
FIG. 1 an axial elevation view of a portion of an integrally bladed turbomachine rotor in accordance with an embodiment of the present invention.
Figure 2:
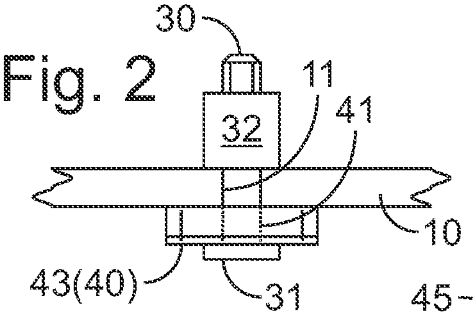
FIG. 2 a view of an impulse element housing fastened to the rotor, as seen radially from the inside.

FIG. 1 shows an axial elevation view of a portion of an integrally bladed turbomachine rotor in accordance with an embodiment of the present invention.

The visible parts of the rotor as seen in FIG. 1 are, in particular, a radially inner shroud 1 having an annular flange 10 and leading and trailing edges 2 of blades formed integrally therewith.

Radially enlarged portions of annular flange 10 have formed therein respective through-openings having a radially inwardly open slot 11. In a modification, the openings have a closed periphery (see also FIG. 6).

A fastening element in the form of a threaded bolt 30 extends through each of these rotor (through-)openings 11 and also through a through-opening 41 in a separately formed, box-like impulse element housing 40.

Figure 3:
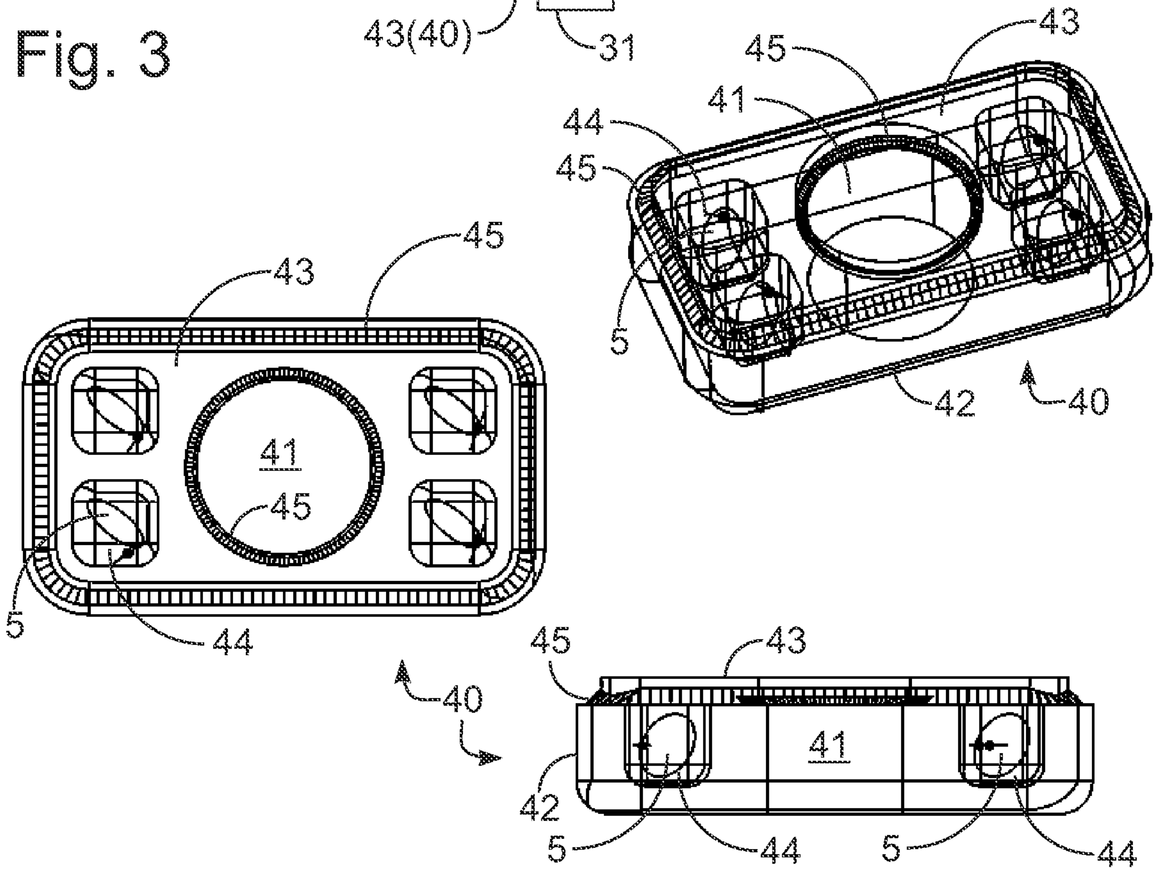
FIG. 3 various grid views of the impulse element housing.

Impulse element housings 40 each have a base 42 and a cover 43, which together bound four cavities 44, in each of which an impulse element 5 is accommodated with play (see FIG. 3).

Base 42 and cover 43 are welded together airtight along an outer periphery and along a periphery of impulse element housing opening 41, respectively, as indicated by welded seams 45.

Annular flanges or heads 31 of the threaded bolts 30 are supported on impulse element housings 40 or their covers 43. On the axially opposite side, threaded bolts 30 are threadedly connected to threaded nuts 32.

Figure 4:
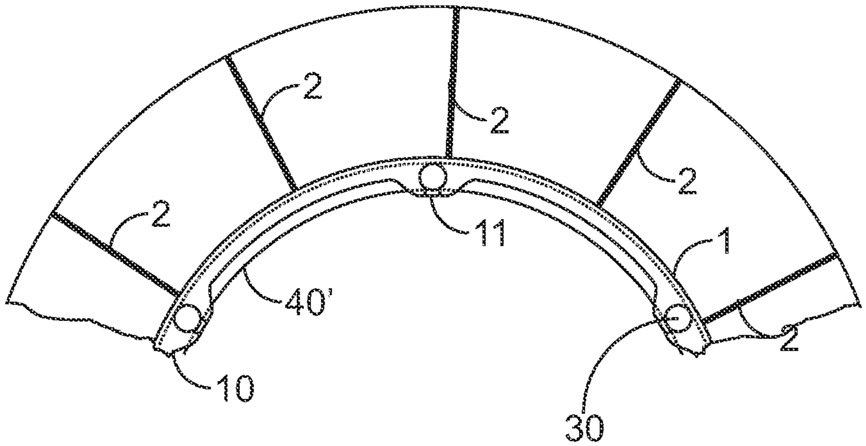
FIG. 4 a view similar to FIG. 1 of a portion of an integrally bladed turbomachine rotor in accordance with another embodiment of the present invention.

FIG. 4 shows in a view similar to FIG. 1 a portion of an integrally bladed turbomachine rotor in accordance with another embodiment of the present invention. Corresponding elements are identified by identical reference numerals, so that reference is made to the above description and only the differences will be discussed below.

In the embodiment of FIGS. 4, a ring-like impulse element housing 40' is fastened to the annular flange 10 of the rotor by threaded bolts 30 distributed equidistantly around the circumference thereof. The cavities in impulse element housing 40' are arranged under the respective blade edges 2 in the same way as in the embodiment of FIG. 1.

Figure 5:
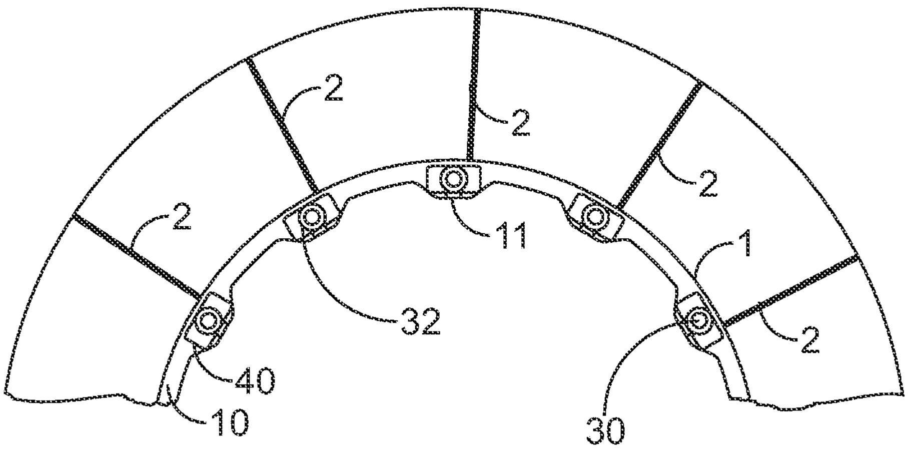
FIG. 5 a view similar to FIG. 1 of a portion of an integrally bladed turbomachine rotor in accordance with a further embodiment of the present invention.

FIG. 5 shows in a view similar to FIGS. 1, 4 a portion of an integrally bladed turbomachine rotor in accordance with a further embodiment of the present invention. Corresponding elements are identified by identical reference numerals, so that reference is made to the above description and only the differences will be discussed below.

In the embodiment of FIG. 5, impulse element housings 40 are disposed on an outer axial end face of the rotor.

While exemplary embodiments have been presented in the foregoing detailed description, it should be noted that many modifications are possible.

For example, impulse element housing 40' may also be disposed on an outer axial end face.

Additionally or alternatively, threaded bolts 30 may also be screwed in in the opposite direction, and their annular flanges or heads 31 may be supported on annular flange 10.

Figure 6:
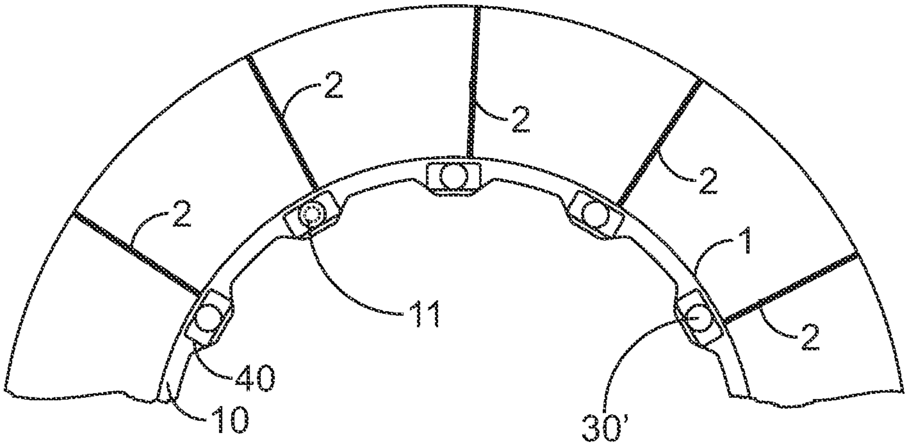
FIG. 6 a view similar to FIG. 1 of a portion of an integrally bladed turbomachine rotor in accordance with another embodiment of the present invention.

In a modification, rivets 30' may also be used instead of threaded bolts 30, as exemplarily indicated in FIG. 6, which otherwise corresponds to FIG. 5.

Additionally or alternatively, the impulse element housings may also rest with their cover against annular flange 10 instead of with their base.

It should also be appreciated that the exemplary embodiments are only examples, and are not intended to limit the scope, applicability, or configuration in any way. Rather, the foregoing detailed description will provide those skilled in the art with a convenient road map for implementing at least one exemplary embodiment, it being understood that various changes may be made in the function and arrangement of elements described without departing from the scope of protection as set forth in the appended claims or derived from combinations of features equivalent thereto.

LIST OF REFERENCE NUMERALS

1 shroud
10 annular (rotor) flange
11 opening (slot)
2 leading/trailing blade edge
30 threaded bolt (fastening element)
30' rivet (fastening element)
31 annular flange
32 threaded nut
40; 40' impulse element housing
41 (impulse element housing) opening
42 impulse element housing base
43 impulse element housing cover
44 cavity
45 welded seam
5 impulse element

What is claimed is:

1. A rotor for a turbomachine comprising:

an integrally bladed rotor and at least one separately formed impulse element housing fastened to the integrally bladed rotor by at least one fastening element engaging for fastening into an opening of the impulse element housing and into an opening of the integrally bladed rotor, the impulse element housing having at least one cavity, at least one impulse element being accommodated with play in the at least one cavity.

2. The rotor as recited in claim 1 wherein the impulse element housing is disposed on an outer or inner axial end face of the integrally bladed rotor.

3. The rotor as recited in claim 1 wherein the impulse element housing is disposed radially under an inner shroud of the integrally bladed rotor.

4. The rotor as recited in claim 1 wherein the cavity is spaced in the circumferential direction from a leading or trailing edge of a nearest blade of the integrally bladed rotor by no more than 25% of a blade pitch.

5. The rotor as recited in claim 1 wherein the impulse element housing is frictionally fastened to the integrally bladed rotor.

6. The rotor as recited in claim 1 wherein the fastening element includes a threaded bolt or a rivet.

7. The rotor as recited in claim 1 wherein the opening of the integrally bladed rotor has a closed periphery or a radially inwardly open slot.

8. The rotor as recited in claim 1 wherein the opening of the integrally bladed rotor is disposed in an annular flange of the rotor.

9. The rotor as recited in claim 8 wherein the opening is disposed in a radially enlarged portion of the annular flange.

10. The rotor as recited in claim 1 wherein the fastening element extends through a through-opening of the impulse element housing defining the opening of the impulse element housing or a through-opening of the integrally bladed rotor defining the opening of the integrally bladed rotor.

11. The rotor as recited in claim 1 wherein the impulse element housing has on either circumferential side of the opening of the impulse element housing the at least one cavity accommodating at least one impulse element with play.

12. The rotor as recited in claim 1 wherein the impulse element housing has at least two radially offset cavities of the at least one cavity, each accommodating at least one impulse element with play.

13. The rotor as recited in claim 1 wherein the impulse element housing has each at least two parts together bounding the cavity and connected together.

14. The rotor as recited in claim 13 wherein the at least two parts are connected together by the fastening element.

15. The rotor as recited in claim 13 wherein the at least two parts are connected together by a material-to-material bond.

16. The rotor as recited in claim 1 wherein the impulse body housing is ring-like or box-like.

17. A compressor or turbine stage of a gas turbine comprising the rotor as recited in claim 1.

18. A turbomachine comprising the rotor as recited in claim 1.

19. A gas turbine comprising the rotor as recited in claim 1.

20. A method for reducing vibrations of the rotor as recited in claim 1 comprising fastening the at least impulse element housing, the at least one housing being separately formed, to the integrally bladed rotor by the at least one fastening element, the fastening element being, at least partially inserted into the opening of the impulse element housing and into the opening of the rotor.

* * * * *